(12) United States Patent
Yu et al.

(10) Patent No.: US 9,045,618 B2
(45) Date of Patent: Jun. 2, 2015

(54) LIQUID STABILIZER MIXTURES

(71) Applicant: BASF SE, Ludwigshafen (DE)

(72) Inventors: Jiong Yu, Congers, NY (US); Roswell Easton King, Pleasantville, NY (US)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 14/345,998

(22) PCT Filed: Sep. 27, 2012

(86) PCT No.: PCT/US2012/057501
§ 371 (c)(1),
(2) Date: Mar. 20, 2014

(87) PCT Pub. No.: WO2013/055524
PCT Pub. Date: Apr. 18, 2013

(65) Prior Publication Data
US 2014/0225038 A1 Aug. 14, 2014

Related U.S. Application Data

(60) Provisional application No. 61/545,323, filed on Oct. 10, 2011.

(51) Int. Cl.
*C08K 5/134* (2006.01)
*C08K 5/52* (2006.01)

(52) U.S. Cl.
CPC .. *C08K 5/134* (2013.01); *C08K 5/52* (2013.01)

(58) Field of Classification Search
CPC ................................. C08K 5/52; C08K 5/134
USPC ............................................. 252/400.24, 404
See application file for complete search history.

(56) References Cited

U.S. PATENT DOCUMENTS

| | | |
|---|---|---|
| 2003/0078340 A1 | 4/2003 | Fatnes et al. |
| 2003/0146542 A1 | 8/2003 | Fatnes et al. |
| 2010/0160509 A1 | 6/2010 | Yazdani-Pedram et al. |
| 2010/0233403 A1 | 9/2010 | Ho et al. |

FOREIGN PATENT DOCUMENTS

EP 2163577 3/2010

*Primary Examiner* — Peter F Godenschwager
(74) *Attorney, Agent, or Firm* — Tyler A. Stevenson

(57) ABSTRACT

The present invention relates to two processes for providing stable liquid blends of a) pentaerythritol tetrakis(3-(3,5-di-tert-butyl-4-hydroxyphenyl)propionate, b) octadecyl 3-(3,5-di-tert-butyl-4-hydroxyphenyl)propionate and c) tris-(2,4-di-tert-butylphenyl)phosphite. The first process comprises preparing a solid mixture comprising about 2 parts to about 3 parts by weight a), about 2 parts to about 3 parts by weight b) and about 2 parts to about 12 parts by weight c), heating the mixture to 185° C. or higher for a sufficient time to obtain a clear liquid blend of a), b) and c), cooling the liquid blend to a temperature of from 90° C. to 140° C. and maintaining the liquid blend at a temperature of from 90° C. to 140° C. The second process comprises preparing a solid mixture comprising about 2 parts to about 3 parts by weight a) and about 2 parts to about 3 parts by weight b), heating the mixture to 90° C. or higher for a sufficient time to obtain a clear liquid mixture of a) and b), adding about 2 parts to about 12 parts by weight c) thereto to obtain a clear liquid blend of a), b) and c) and maintaining the liquid blend at a temperature of from 90° C. to 140° C. The liquid blends of a), b) and c) are stable at the temperature at which they are maintained for greater than 120 hours.

10 Claims, No Drawings

LIQUID STABILIZER MIXTURES

The present invention relates to processes for providing stable liquid blends of a) pentaerythritol tetrakis(3-(3,5-di-tert-butyl-4-hydroxyphenyl)propionate, b) octadecyl 3-(3,5-di-tert-butyl-4-hydroxyphenyl)propionate and c) tris-(2,4-di-tert-butylphenyl)phosphite. The liquid blends of stabilizers are useful as stabilizers for organic materials, for instance synthetic polymer stabilization.

Pentaerythritol tetrakis(3-(3,5-di-tert-butyl-4-hydroxyphenyl)propionate, octadecyl 3-(3,5-di-tert-butyl-4-hydroxyphenyl)propionate and tris-(2,4-di-tert-butylphenyl)phosphite are well known polymer stabilizers, commercially available as IRGANOX 1010, IRGANOX 1076 and IRGAFOS 168 respectively. IRGANOX 1010 and IRGANOX 1076 are hindered phenolic antioxidants and IRGAFOS 168 is a phosphite processing stabilizer.

Pentaerythritol tetrakis(3-(3,5-di-tert-butyl-4-hydroxyphenyl)propionate, IRGANOX 1010 is:

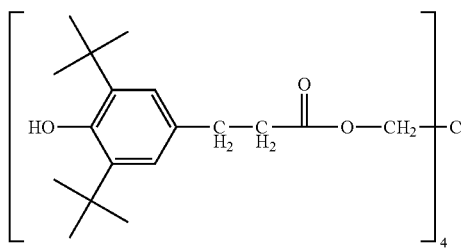

Octadecyl 3-(3,5-di-tert-butyl-4-hydroxyphenyl)propionate, IRGANOX 1076 is:

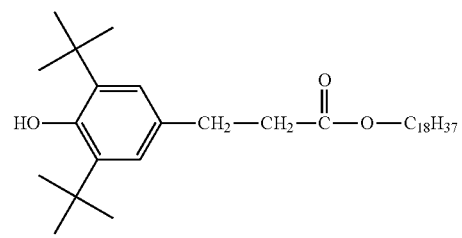

Tris-(2,4-di-tert-butylphenyl)phosphite, IRGAFOS 168 is:

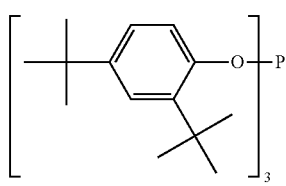

The stabilizers are all solids at room temperature. IRGANOX 1010 has a melting point of ca. 120° C. IRGANOX 1076 has a melting point of ca. 56° C. IRGAFOS 168 melts at ca. 185° C.

It would be advantageous for industry to be able to provide a liquid blend of these well known stabilizers. A liquid blend could be pumped to be incorporated into a polymer during melt processing or during solution polymerization. Dosing would be more accurate and incorporation would be easier to perform.

Two processes have now been found for forming a stable liquid blend of a) pentaerythritol tetrakis(3-(3,5-di-tert-butyl-4-hydroxyphenyl)propionate, b) octadecyl 3-(3,5-di-tert-butyl-4-hydroxyphenyl)propionate and c) tris-(2,4-di-tert-butylphenyl)phosphite.

First Process.

Disclosed is a process for forming a stable liquid blend of
a) pentaerythritol tetrakis(3-(3,5-di-tert-butyl-4-hydroxyphenyl)propionate,
b) octadecyl 3-(3,5-di-tert-butyl-4-hydroxyphenyl)propionate and
c) tris-(2,4-di-tert-butylphenyl)phosphite,
which process comprises preparing a solid mixture comprising about 2 parts to about 3 parts by weight a), about 2 parts to about 3 parts by weight b) and about 2 parts to about 12 parts by weight c), heating the mixture to 185° C. or higher for a sufficient time to obtain a clear liquid blend of a), b) and c), cooling the liquid blend to a temperature of from 90° C. to 140° C. and maintaining the liquid blend at a temperature of from 90° C. to 140° C.,
where the liquid blend of a), b) and c) is stable at the temperature at which it is maintained for greater than 120 hours.

Preferably, the process comprises preparing a solid mixture comprising about 5 parts to about 11 parts by weight c).

More preferably, the process comprises preparing a solid mixture comprising about 8 parts to about 11 parts by weight c).

Preferably, the liquid blend of a), b) and c) is maintained at a temperature of from 90° C. to 125° C.

More preferably, the liquid blend of a), b) and c) is maintained at a temperature of from 90° C. to 110° C.

Second Process.

Further disclosed is a process for forming a stable liquid blend of
a) pentaerythritol tetrakis(3-(3,5-di-tert-butyl-4-hydroxyphenyl)propionate,
b) octadecyl 3-(3,5-di-tert-butyl-4-hydroxyphenyl)propionate and
c) tris-(2,4-di-tert-butylphenyl)phosphite,
which process comprises preparing a solid mixture comprising about 2 parts to about 3 parts by weight a) and about 2 parts to about 3 parts by weight b), heating the mixture to 90° C. or higher for a sufficient time to form a clear liquid mixture of a) and b), adding about 2 parts to about 12 parts by weight c) thereto to obtain a clear liquid blend of a), b) and c) and maintaining the liquid blend at a temperature of from 90° C. to 140° C.,
where the liquid blend of a), b) and c) is stable at the temperature at which it is maintained for greater than 120 hours.

Preferably, the process comprises adding about 5 to about 11 parts by weight c) to the liquid mixture of a) and b).

More preferably, the process comprises adding about 8 to about 11 parts by weight c) to the liquid mixture of a) and b).

Preferably, the liquid blend of a), b) and c) is maintained at a temperature from 90° C. to 125° C.

More preferably, the liquid blend of a), b) and c) is maintained at a temperature from 90° C. to 110° C.

Cooling may be active cooling or allowing slowly to cool at ambient conditions.

Stable means no observed precipitation or solids at a certain temperature for greater than a certain length of time.

EXAMPLE 1

10 gram samples of IRGANOX 1010/IRGANOX 1076/IRGAFOS 168 are dry mixed and placed in a glass vial in a 200° C. oven for half an hour. Clear liquid blends are achieved. The clear liquid blends are then transferred to ovens set at 150° C., 140° C. and 135° C. to observe if any precipitation occurs at these temperatures at 24, 48, 72, 96 and 120 hour time periods.

The following results are observed at 120 hours:

|  | Formulation | | | | |
| --- | --- | --- | --- | --- | --- |
|  | 1 | 2 | 3 | 4 | 5 |
| IRGANOX 1010 wt. % | 9 | 11 | 13.8 | 16 | 18 |
| IRGANOX 1076 wt. % | 22 | 20 | 17.2 | 15 | 13 |
| IRGAFOS 168 wt. % | 69 | 69 | 69 | 69 | 69 |
| Precipitation Temp. (° C.) | >140 | >140 | <135 | <135 | <135 |

Formulations 3-5 are very stable liquid blends. Higher levels of IRGANOX 1010 are advantageous even though its melting point is much higher than IRGANOX 1076.

EXAMPLE 2

Example 1 is repeated, except that in this case, glass vials containing mixtures of IRGANOX 1010 and IRGANOX 1076 are placed in an oil bath and heated to greater than 90° C. to obtain a clear liquid. IRGAFOS 168 is slowly added to the liquid with stirring to obtain a clear liquid blend. The liquid blends are transferred to ovens set at 150° C., 140° C. and 135° C. to observe if any precipitation occurs at these temperatures at 24, 48, 72, 96 and 120 hour time periods.

The invention claimed is:

1. A process for forming a stable liquid blend of
   a) pentaerythritol tetrakis(3-(3,5-di-tert-butyl-4-hydroxyphenyl)propionate,
   b) octadecyl 3-(3,5-di-tert-butyl-4-hydroxyphenyl)propionate and
   c) tris-(2,4-di-tert-butylphenyl)phosphite,
   which process comprises preparing a solid mixture comprising about 2 parts to about 3 parts by weight a), about 2 parts to about 3 parts by weight b) and about 2 parts to about 12 parts by weight c), heating the mixture to 185° C. or higher for a sufficient time to obtain a clear liquid blend of a), b) and c), cooling the liquid blend to a temperature of from 90° C. to 140° C. and maintaining the liquid blend at a temperature of from 90° C. to 140° C.,
   where the liquid blend of a), b) and c) is stable at the temperature at which it is maintained for greater than 120 hours.

2. A process according to claim 1 which comprises preparing a solid mixture comprising about 5 parts to about 11 parts by weight c).

3. A process according to claim 1 which comprises preparing a solid mixture comprising about 8 parts to about 11 parts by weight c).

4. A process according to claim 1 where the liquid blend of a), b) and c) is maintained a temperature of from 90° C. to 125° C.

5. A process according to claim 1 where the liquid blend of a), b) and c) is maintained a temperature of from 90° C. to 110° C.

6. A process for forming a stable liquid blend of
   a) pentaerythritol tetrakis(3-(3,5-di-tert-butyl-4-hydroxyphenyl)propionate,
   b) octadecyl 3-(3,5-di-tert-butyl-4-hydroxyphenyl)propionate and
   c) tris-(2,4-di-tert-butylphenyl)phosphite,
   which process comprises preparing a solid mixture comprising about 2 parts to about 3 parts by weight a) and about 2 parts to about 3 parts by weight b), heating the mixture to 90° C. or higher for a sufficient time to obtain a clear liquid mixture of a) and b), adding about 2 parts to about 12 parts by weight c) thereto to obtain a clear liquid blend of a), b) and c) and maintaining the liquid blend at a temperature of from 90° C. to 140° C.,
   where the liquid blend of a), b) and c) is stable at the temperature at which it is maintained for greater than 120 hours.

7. A process according to claim 6 which comprises adding about 5 to about 11 parts by weight c) to the liquid mixture of a) and b).

8. A process according to claim 6 which comprises adding about 8 to about 11 parts by weight c) to the liquid mixture of a) and b).

9. A process according to claim 6 where the liquid blend of a), b) and c) is maintained at a temperature from 90° C. to 125° C.

10. A process according to claim 6 where the liquid blend of a), b) and c) is maintained at a temperature from 90° C. to 110° C.

* * * * *